US006895002B2

United States Patent
Shah et al.

(10) Patent No.: US 6,895,002 B2
(45) Date of Patent: May 17, 2005

(54) METHOD AND SYSTEM TO PROVIDE A SINGLE TELEPHONE NUMBER FOR GEOGRAPHICALLY DISPERSED TELEPHONY SERVICE SUBSCRIBERS

(75) Inventors: Kamal R. Shah, Portland, OR (US); James R. Trethewey, Hillsboro, OR (US); Thomas Mark James, Waiheke Island (NZ)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 09/791,057

(22) Filed: Feb. 21, 2001

(65) Prior Publication Data

US 2002/0145973 A1 Oct. 10, 2002

(51) Int. Cl.⁷ .............................................. H04L 12/66
(52) U.S. Cl. ...................................... 370/356; 370/352
(58) Field of Search ................................ 370/352–356, 370/389, 392, 410, 522; 379/67, 88, 89, 90.1, 93.01, 93.09, 93.35, 210, 212, 215, 230, 265, 309, 207, 201, 219, 220, 221, 266

(56) References Cited

U.S. PATENT DOCUMENTS

| 5,923,745 | A | * | 7/1999 | Hurd ...................... 379/265.02 |
| 6,011,844 | A | * | 1/2000 | Uppaluru et al. ......... 379/220.01 |
| 6,078,581 | A | * | 6/2000 | Shtivelman et al. ........... 370/352 |
| 6,137,870 | A | * | 10/2000 | Scherer .................. 379/127.06 |
| 6,324,276 | B1 | * | 11/2001 | Uppaluru et al. ......... 379/220.01 |
| 6,363,065 | B1 | * | 3/2002 | Thornton et al. ............ 370/352 |
| 6,381,329 | B1 | * | 4/2002 | Uppaluru et al. ......... 379/266.04 |
| 6,411,692 | B1 | * | 6/2002 | Scherer .................. 379/127.01 |
| 6,556,671 | B1 | * | 4/2003 | Beauvois ................ 379/265.02 |
| 6,606,668 | B1 | * | 8/2003 | MeLampy et al. ........... 709/241 |
| 6,661,785 | B1 | * | 12/2003 | Zhang et al. ................ 370/352 |
| 6,687,241 | B1 | * | 2/2004 | Goss .......................... 370/352 |
| 6,757,290 | B1 | * | 6/2004 | Kalmanek et al. ........... 370/401 |
| 6,791,971 | B1 | * | 9/2004 | Osman et al. ............... 370/352 |
| 6,798,786 | B1 | * | 9/2004 | Lo et al. ...................... 370/468 |

* cited by examiner

Primary Examiner—Wellington Chin
Assistant Examiner—Jamal A. Fox
(74) Attorney, Agent, or Firm—S. K. Murthy

(57) ABSTRACT

A system is described for providing a single telephone number for geographically dispersed telephony service subscribers. The system includes an automatic call distributor (ACD) coupled to receive incoming calls from a public switched telephone network (PSTN) and a plurality of gateways coupled between the ACD and the Internet. Each one of the gateways is assigned to service a defined group of subscribers. The ACD selectively interconnects an incoming telephone call from the PSTN to an appropriate one of the gateways based on at least a portion of a setup message field identifying a telephone number forwarding the incoming telephone call.

29 Claims, 7 Drawing Sheets

METHOD AND SYSTEM TO PROVIDE A SINGLE TELEPHONE NUMBER FOR GEOGRAPHICALLY DISPERSED TELEPHONY SERVICE SUBSCRIBERS

BACKGROUND

1. Field of the Invention

The present invention generally relates to Internet and telephonic communications, and in particular, to a method and system to provide a single telephone number for geographically dispersed telephony service subscribers.

2. Description of the Related Art

Call waiting service provided by telephone companies enables telephone users to accept or ignore an incoming telephone call when the user is talking to another person over the telephone line. Because telephone lines are often used to access the Internet in addition to making voice calls, Internet call waiting (ICW) services are provided to enable subscribers to receive incoming telephone calls even when the subscriber's telephone line is being used to access the Internet.

Gateway servers, such as Internet Protocol (IP) telephony gateways, may be used to provide ICW services. ICW service center may employ a number of gateways connected between the Internet and the Public Switched Telephone Network (PSTN) via telephone trunk lines, such as Integrated Service Digital network (ISDN) Primary Rate Interface (PRI) lines. Typically, each of the gateways is assigned to service a predefined group of subscribers. In some implementations, subscribers are partitioned geographically (e.g., by the area code of the subscriber's telephone number).

Typically, ICW service providers will assign a telephone number for each of the gateways. This means that if the ICW service provider has four gateways to service its subscribers, there will be four separate telephone numbers assigned to the four gateways. Because each subscriber is preassigned to a particular gateway, subscribers are required to program their call forwarding function to forward their telephone calls to the telephone number corresponding to the gateway they are assigned to. As a result, subscribers in certain predefined region will be assigned a certain telephone number while subscribers in another region will be assigned a different telephone number.

There are a number of problems associated with such conventional ICW architecture. For example, if for any reason subscribers are reassigned from one gateway to another gateway (e.g., perhaps because the area code of their telephone number changed), the subscribers are required to reprogram their call forwarding service to forward their incoming call to a different telephone number, which introduces opportunity for user error. Further, the conventional ICW architecture does not provide for service redundancy in the event that one of the gateways fails, or one of the PRI lines coupled to gateways fails.

DETAILED DESCRIPTION

In the following description, specific details are set forth in order to provide a thorough understanding of the present invention. However, it will be apparent to one skilled in the art that the present invention may be practiced without these specific details. In other instances, well-known circuits, structures and techniques have not been shown in detail in order to avoid obscuring the present invention.

Figure 1:
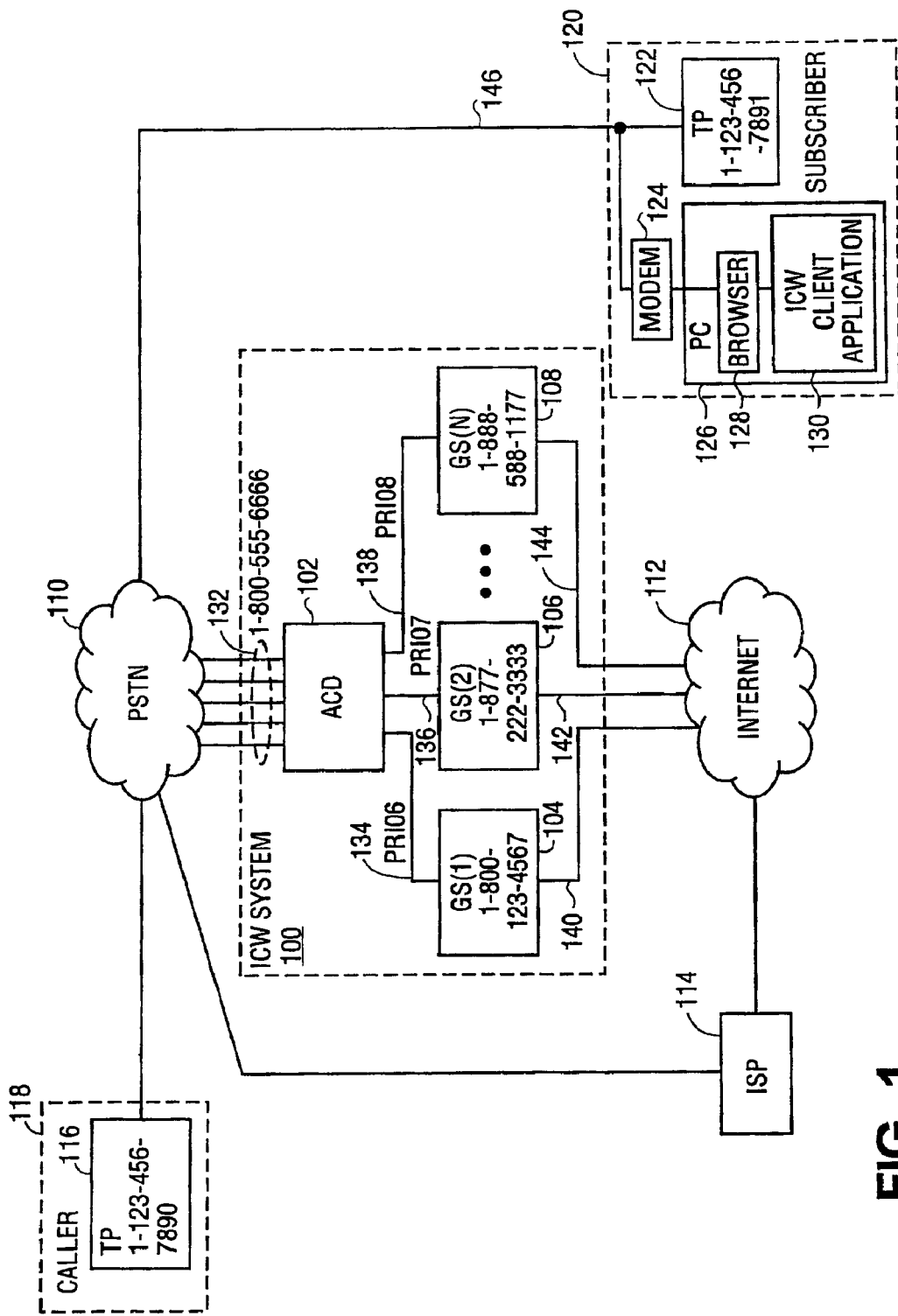
FIG. 1 is a block diagram of a system for providing Internet call waiting service according to one embodiment of the present invention.

FIG. 1 depicts a system 100 for providing a single telephone number for telephony service subscribers according to one embodiment of the invention. In the illustrated embodiment, the system 100 is configured to provide Internet call waiting (ICW) service. The ICW system 100 includes an automatic call distributor (ACD) 102 configured according to one embodiment of the invention. The ACD 102 is connected on one side to a public switched telephone network (PSTN) 110 via one or more primary rate interface lines (inbound PRI lines) 132 and on the other side to a number of Internet Protocol (IP) gateway servers, GS(1) through GS(N) via outbound PRI lines 134–138. Each of inbound and outbound PRI lines includes multiple channels to handle multiple simultaneous telephone connections. It should be noted gateway servers GS(1) through GS(N) may reside in a single location or may reside in different geographic locations.

By incorporating the ACD 102 configured according to the present invention between the PSTN 110 and the gateway servers 104–108, the ICW system 100 is able to provide a single centralized telephone number to service geographically dispersed ICW subscribers. In one embodiment, a single toll-free number is assigned to the inbound PRI lines 132 coupling the ACD 102 to the PSTN 110. The incoming calls forwarded to this single centralized telephone number are automatically routed by the ACD 102 to an appropriate gateway assigned to service the incoming call.

Accordingly, the ICW system 100 provides a number of advantages over the conventional ICW service architecture which require each subscriber to forward incoming calls to a particular telephone number associated with a gateway assigned to the subscriber. In the conventional ICW service architecture, because the IP telephony gateway assigned to a particular subscriber is subject to change from time to time, subscribers are required to reprogram their call forwarding function every time the gateway assigned to them changes, which introduces the opportunity for user error. In contrast, the subscribers of the ICW system 100 constructed according to the present invention are not required to reprogram their call forwarding function even if the gateway assigned to them changes.

As noted earlier, the ACD 102 is configured to selectively interconnect incoming calls from the PSTN to one of the gateways assigned to service the incoming call. Alternatively or in addition to, the ACD 102 may also be configured to detect failure of any one of the gateways GS(1) through GS(N) and PRI lines 134–138 and automatically route an incoming call to a properly operating gateway in the event a failure has been detected in one of the gateways assigned to service the incoming call.

The ACD 102 may be specifically constructed for the required purposes, or it may comprise a general purpose ACD configured or modified by a software program running in the ACD. Alternatively, the ACD 102 may be a general purpose computer configured to perform operations described herein. In one embodiment, the general purpose computer in which the operations of the invention may be implemented includes one or more ISDN PRI adapter cards. In one implementation, the ISDN PRI adapter cards are any combination of dialogic ISDN PRI adapter cards available from Intel Corporation of Santa Clara, Calif., including DTI/240SC, DTI/480SC, D/240SC-T1, D/240SC-2T1, D/480SC-2T1 and D/240PCI-T1. Alternatively, other ISDN PRI adapter cards may be used.

Additionally, the operations performed by the present invention may be embodied in the form of software program stored on a machine-readable medium, such as, but is not limited to, any type of disk including floppy disks, hard disks, optical discs, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. Moreover, the present invention is not described with reference to any particular programming language. It will be appreciated that a variety of programming languages may be used to implement the teachings of the invention as described herein.

The ICW system 100 can support a number of ICW subscribers. Each subscriber environment 120 typically includes a telephone 122 and a personal computer 126 sharing a single telephone line 146 connected to the PSTN 110. The subscriber uses an Internet browser (e.g., Netscape Navigator, Microsoft Internet Explorer) 128 running in the computer 126 to access the Internet 112 via an Internet Service Provider (ISP) 114. When the subscriber logs onto the Internet 112, there is an ICW client application 130 running in the computer 126 that sends a message over the Internet to the ICW system 100 to indicate that the subscriber is currently online and to notify the IP address and telephone number of the subscriber.

Based on the information received from subscribers who are currently online, each of the gateways 104–108 maintains a table that lists the telephone number along with the IP address associated with each subscriber who is online. This way, the gateway server is able to look at this table when an incoming call comes in and determine if the telephone number forwarding the incoming call matches the telephone number listed in the table and if it is, the gateway server is able to identify and bridge the call to an appropriate IP address associated with the forwarding telephone number.

As an example, assume that a caller 118 calls the subscriber by dialing the destination telephone number of subscriber (e.g., 1-123-456-7891). If the call is made while the subscriber 120 is online, the caller 118 would normally get a busy signal or may get continuous ringing since the subscriber is unaware that someone is calling. However, the subscriber 120 has previously programmed the telephone line 146 to forward incoming calls to the ICW system 100 when the subscriber's telephone line is busy. In this regard, if someone tries to call the subscriber while the subscriber is online, the incoming calls designated for the subscriber will get redirected to the ICW system 100 via the call forwarding function provided by the Telephone Company.

When an incoming call originally designated for the subscriber 120 gets forwarded to the ICW system 100, a setup message associated with the incoming call will be received over one of inbound PRI lines 132, which typically contains the following information (1) Automatic Number Identification (ANI), (2) Destination Number Identification String (DNIS) and (3) Redirecting Number Element (RNE). These information elements, ANI, RNE and DNIS, are part of the ISDN (ITU-T Q.931 standard) setup message used to initiate a telephone call. The ANI information indicates the telephone number of the caller and is also commonly referred to as "Caller ID." The RNE identifies the telephone number of the entity forwarding the incoming call. The DNIS contains the telephone number of the final destination being called.

The ACD 102 is configured to distribute incoming calls to an appropriate gateway based on information provided in the setup message of an incoming call. When a subscriber's call gets forwarded to the ICW system 100, subscriber's telephone line is the entity which is doing the forwarding so the subscriber's telephone number will be contained in the RNE field of the setup message. In one embodiment, the ACD 102 examines the RNE field of the setup message to distribute incoming calls to an appropriate gateway. For example, the ACD 102 may use the information provided in the RNE field in order to identify the area code of the telephone number the call was originally designated for and based on the area code information, route the incoming call to an appropriate gateway. The ACD 102 may also be configured to route incoming calls based on any other portion of the RNE field. For example, the exchange (i.e., middle three numbers) or any other combination of numbers contained in the RNE field may be used by the ACD in order to identify the gateway previously assigned to service the incoming call.

In one embodiment, before the ACD 102 routes the incoming call to one of the gateways 104–108, the ACD will modify the setup message of the outbound call to one of the gateways such that the data contained in the ANI and RNE fields of the setup message of the outbound call are the same as the ANI and RNE fields of the setup message of the incoming call from the PSTN, since an ICW server application program running in the gateway may rely on the data contained in the ANI and RNE fields of the setup message as they were originally received from the PSTN to properly process the incoming call.

Advantageously, any of the gateways GS(1) through GS(N) of the ICW system 100 may be reconfigured to service different subscribers without requiring the subscribers to reprogram their call forwarding function with their telephone companies. For example, if subscribers have been previously partitioned based on their telephone area codes, any of the gateways 104–108 can subsequently be reconfigured to service subscribers in different area codes without requiring subscribers to reprogram their call forwarding services. In addition, when the number of subscribers exceeds the current capacity, additional gateways can be subsequently added to the ICW system 100 without requiring subscribers to reprogram their call forwarding services.

The ACD 102 uses a configuration file which contains a list of the inbound PRI lines 132 from the PSTN 110, and a list of the outbound PRI lines 134–138 to the gateways GS(1) through GS(N). As an example, a configuration file used by the ACD is provided below which shows each outbound PRI line associated with a list of codes or patterns (e.g., area codes). In the illustrated configuration file, each of outbound PRI lines (e.g., pri06, pri07 and pri08) is associated with a list of area codes that the corresponding gateway server is assigned to service during normal operation.

```
Inbound (800)555-6666
    {
                    pri01
                    pri02
                    pri03
                    pri04
                    pri05
    }
Outbound
    {
                    pri06 (800)123-4567 212, 718, 914, 516
                    pri07 (877)222-3333 312, 708
                    pri08 (888)588-1177 503, 360, 541, 971
    }
```

This configuration file also indicates that there are a number of inbound PRI lines (e.g., pri01 through pri05) and a single centralized telephone number (e.g., 1-800-555-6666) associated with the inbound PRI lines. By forwarding all incoming calls to this single centralized telephone number, geographically dispersed subscribers can forward their calls to this centralized telephone number regardless of their area codes and thereby the subscribers do not have to be concerned about the specific telephone number associated with the gateway assigned to handle their calls. Also included in the configuration file are identification of each of the outbound PRI lines (e.g., pri06, pri07 and pri08) and a telephone number associated with each of the outbound PRI lines.

As noted earlier, in one embodiment, the ACD 102 examines the RNE field of the setup message to identify the area code of the subscriber's telephone number forwarding the call. Then, the ACD 102 searches through the outbound PRI line entries in the configuration file to determine if the area code contained in the RNE field matches with one of the area codes listed in the configuration file and if so the ACD will bridge the call to the corresponding outbound PRI line. For example, if the RNE field of the setup message indicates area code (e.g., 212), then the ACD will interconnect the incoming call to the outbound PRI line (pri06), as specified in the configuration file. Note that the telephone numbers and area codes associated with the PRI lines shown in FIG. 1 and above example are just sample numbers, and may be different. The telephone number examples shown herein are 10-digit numbers according to the North American Numbering Plan (NANP); but the invention is equally applicable to other regions of the world where telephone numbers are described using different lengths and formats (e.g., ITU E.164).

Once the incoming call has been routed to an appropriate gateway by the ACD 102, an ICW server application program running in the gateway will examine the setup message of the incoming call to identify the telephone number of the subscriber the call was originally designated for. The ICW server application program maintains a table that lists an IP address associated with each of the subscribers currently online. In this regard, the ICW server application program will search through the table to find the IP address associated with the subscriber's telephone number contained in the setup message of the incoming call. By specifying the IP address, the gateway server is able to forward a notification of the incoming call over the Internet to the subscriber's browser and/or an ICW client application program 130 running in the subscriber's computer 126. In response to the notification of the incoming call, the ICW client application program 130 running in the subscriber's computer 126 will notify the subscriber that there is a call waiting coming via the Internet connection and caller ID information may also be displayed. At this time, the subscriber may accept or reject the incoming call. Alternatively, the subscriber may also request that the incoming call be forwarded to another telephone number.

Figure 2A:
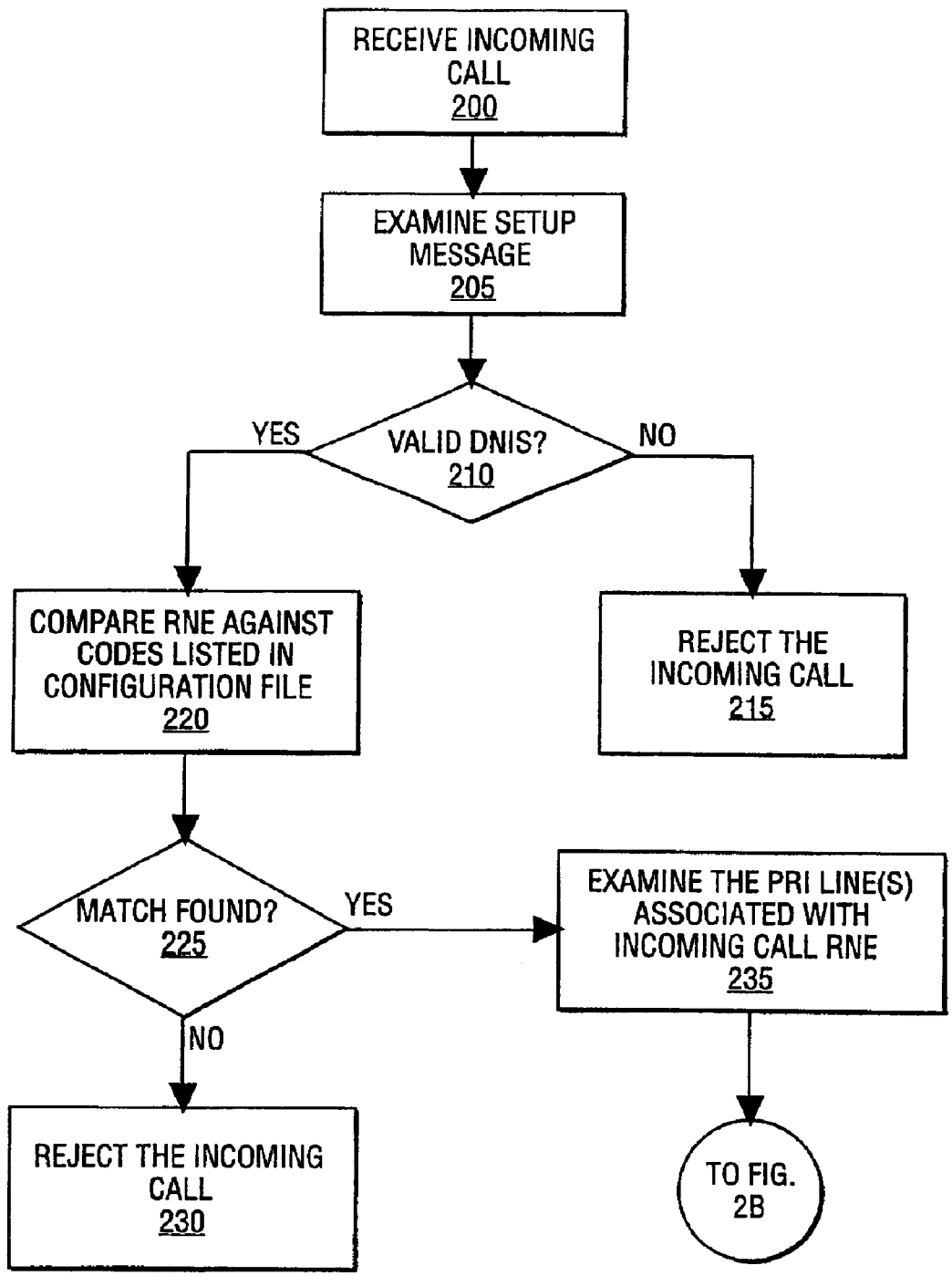
FIGS. 2a and 2b are flowcharts of processing incoming calls according to one embodiment of the invention.
Figure 2B:
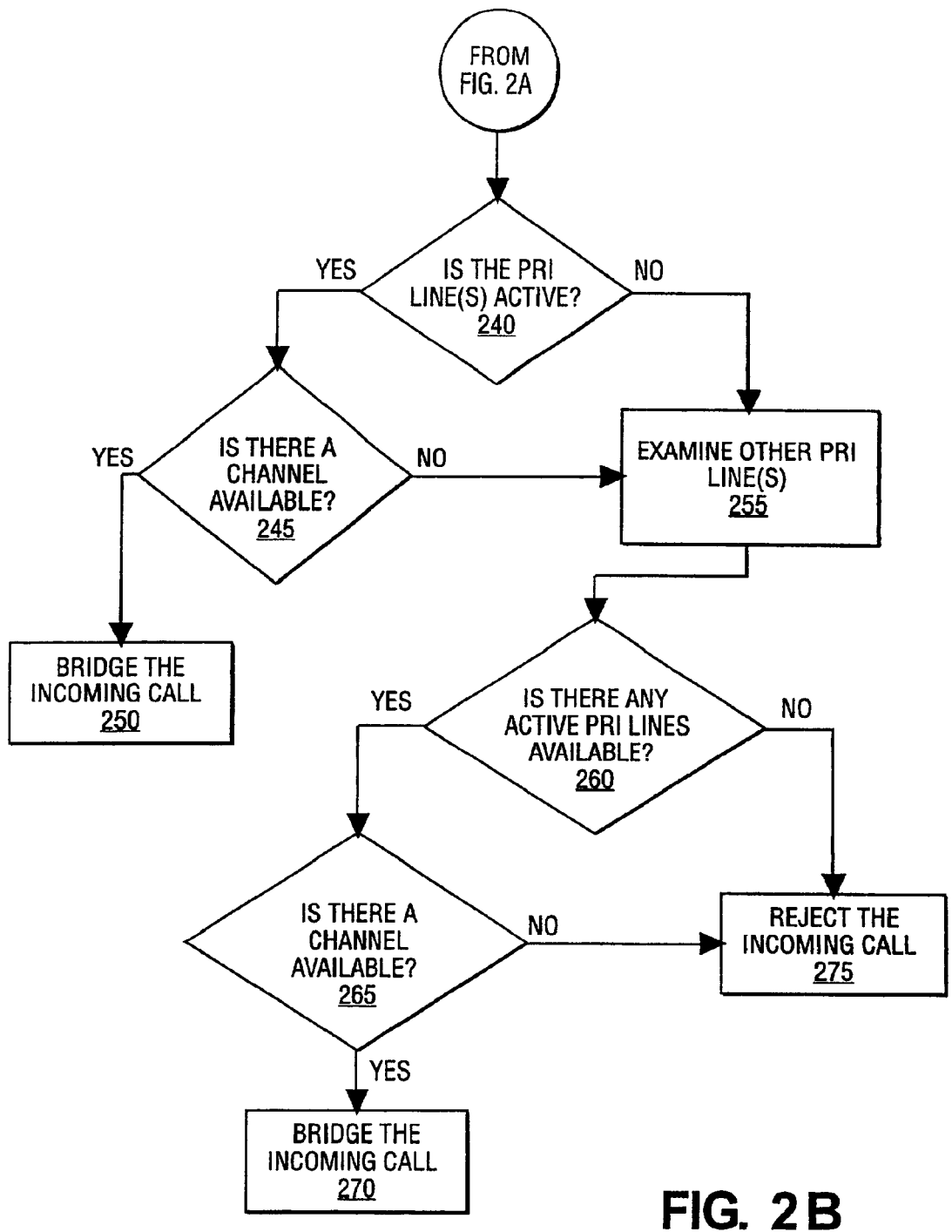

FIGS. 2a and 2b depict operations of processing incoming calls according to one embodiment of the invention. In one embodiment, the incoming call processing (ICP) logic for processing incoming calls resides in the ACD 102. In block 200, the ACD receives an incoming call from the PSTN. The incoming call is triggered by the receipt of an ISDN setup message. In block 205, the ICP logic examines the setup message of the incoming call, which may contain any or all of the ANI, RNE, and DNIS information fields. In one implementation, the ICP logic examines the setup message of the incoming call to determine if it has a valid DNIS (block 210). If the DNIS matches the inbound telephone number listed in the configuration file (block 210, yes), the ICP logic proceeds to block 220. If the DNIS information is missing, it is considered valid and also proceeds to block 220. If the DNIS does not match the inbound telephone number listed in the configuration file (block 210, no), the incoming call is considered invalid and the ICP logic will reject the incoming call in block 215. Alternatively, the ICP logic may ignore the DNIS field of the setup message and automatically assumes that it is valid.

In functional block 220, which occurs if the DNIS was valid, the ICP logic compares a portion of data contained in the RNE field with codes or patterns (e.g., area codes) listed in the outbound section of the configuration file. The RNE field may contain a 10-digit telephone number. The codes or patterns listed in the configuration file may be a subset of the 10-digit telephone number. In one embodiment, the codes specified in the configuration file correspond to 3-digit area code. Alternatively, 6-digit (area code and exchange) may also be used. In decision block 225, the ICP logic determines if the portion of data contained in the RNE field of the setup message matches with any of the codes (e.g., area code) listed in the configuration file. If the RNE data of the incoming call setup message does not match any of the codes listed in the configuration file (block 225, no), the incoming call is considered invalid and the ICP will reject the call in block 230. If the RNE of the incoming call does not match any of the patterns, this means that the area code of forwarding telephone number is not supported by any of the gateways.

If the RNE of the incoming call matches one of the codes or patterns listed in the configuration file (block 225, yes), the ICP logic proceeds to block 235. In block 235, the PRI line(s) associated with the gateway assigned to service the incoming call is examined. Then in block 240, the ICP logic determines if such PRI line is active. If it is active (block 240, yes), the ICP logic proceeds to block 245 where it determines if there is a channel in the PRI line that is available (i.e., not-in-use). If there a channel available (block 245, yes), the ICP logic bridges the incoming call from the PSTN to the assigned gateway by placing a call on the available channel in block 250. In this regard, the incoming call is automatically routed to an appropriate gateway based on the data contained in the RNE field of the setup message. Once the incoming call has been properly routed, the connection is maintained until either side terminates the call.

If the status of such PRI line is inactive (block 240, no) or all channels of such PRI line are currently busy/in-use (block 245, no), the ICP logic proceeds to block 255 where it uses a redundancy mechanism to service the incoming call. In one embodiment of the present invention, the redundancy mechanism is provided to enable another gateway to process the incoming call in the event a failure is detected in one of the gateways originally assigned to service the incoming call. In this embodiment, at least one gateway will have a copy of the subscriber information necessary for carrying out the ICW service of the failed gateway, such as telephone number and IP address of subscribers assigned to the failed gateway. In this regard, the ICP logic will examine other outbound PRI lines listed in the configuration file in block 255 and determine if there is any active PRI line available in block 260. Then in block 265, the ICP logic determines if there is any available channel in the PRI line identified as being active. If there is an available channel in an active PRI line (block 265, yes), the ACD will bridge the incoming call from the PSTN to one of the gateways by setting the DNIS field of the setup message to be the telephone number of the PRI line identified as being active and available in block 270. If no PRI line is active or none of the PRI line channels are available (block 260, no), the ICP logic will reject the incoming call in block 275.

Figure 3:
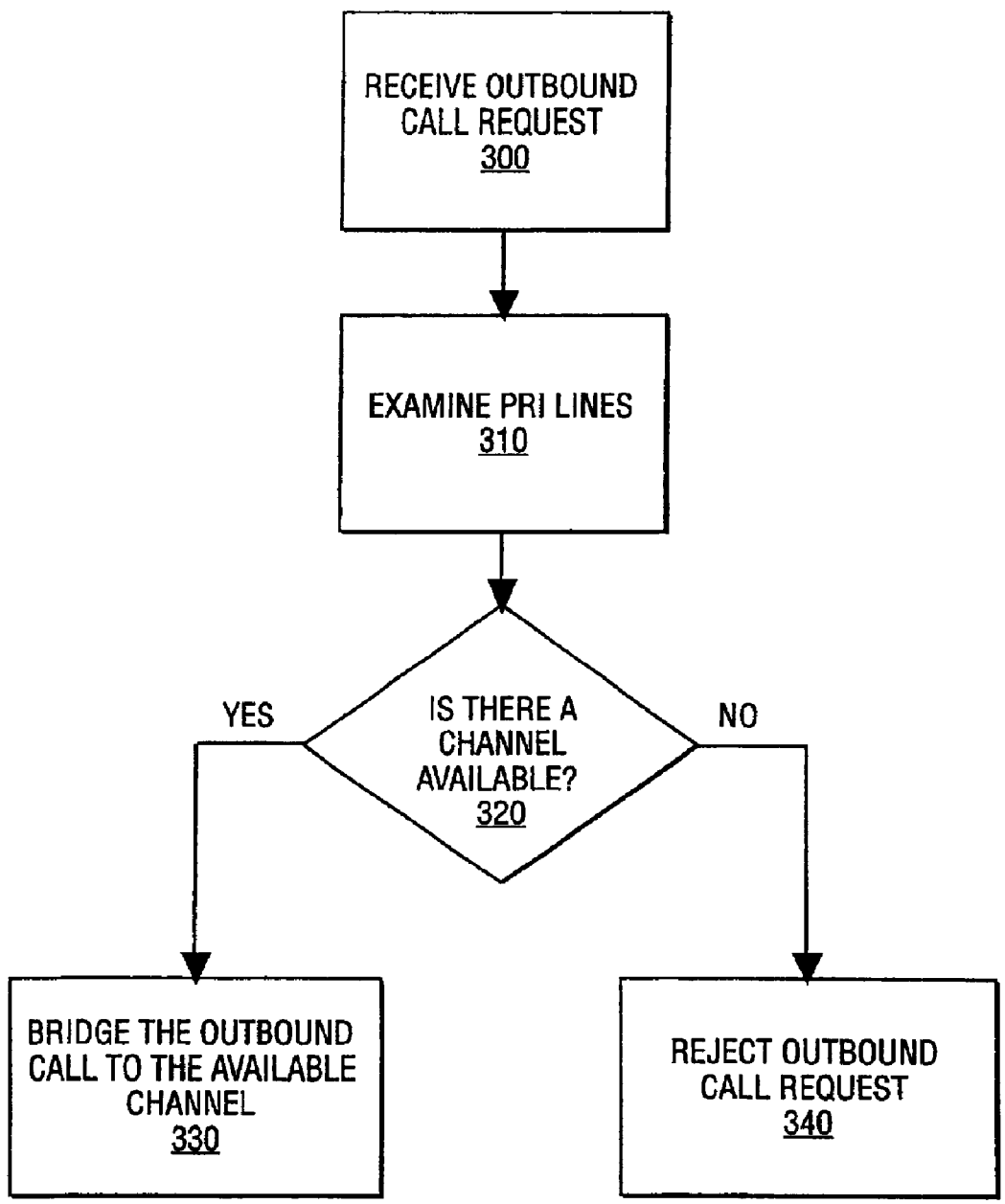
FIG. 3 is a flowchart of processing outbound calls according to one embodiment of the invention.

FIG. 3 depicts operations of processing outbound calls according to one embodiment of the invention. In one embodiment, the outbound call processing (OCP) logic for processing outbound calls resides in the ACD. When the ACD needs to place an outbound call to the PSTN, any channel available on one of the active PRI lines may be used. There are a number of reasons why the ACD needs to place an outbound call. For example, in response to a notification of an incoming call via the Internet, the subscriber of the ICW service may request that the incoming call be forwarded to another telephone number. This request to reroute the incoming call to another telephone number is processed by one of the gateways and the gateway will in turn dispatch an outbound call request to the ACD. In such cases, the ACD will receive an outbound call request from one of the gateways in block 300. Then, in block 310, the OCP logic examines inbound PRI lines 132 to identify active PRI lines. In block 320, the OCP logic determines if there is a channel available in one of the active PRI lines. If there is an available channel (block 320, yes), the OCP logic will bridge the outbound call request from one of the gateways to the PSTN via the channel identified as being active and available (block 330). If no PRI line is active and available (block 320, no), the OCP logic will reject the outbound call request in block 340.

During normal operation, the ACD will route incoming calls to an appropriate gateway based on RNE field of the incoming call. However, in the event a failure is detected in one of the gateways, the ICW system 100 may be configured to automatically route the incoming calls to another gateway that is still operating to provide gateway redundancy. In one embodiment, a heartbeat mechanism is provided between the ACD and the gateways so that a heartbeat signal can be sent between the ACD and the gateways to periodically indicated that the gateway is functioning properly. In one implementation, the ACD will send ISDN "STATUS ENQUIRY" messages to each of the gateways over the PRI lines. If the gateway is active, it will reply with ISDN "STATUS" messages. If the gateway has failed, no response will be provided. If a gateway is repaired and returned to active service, it will begin responding with "STATUS" messages again. The ACD can use this response behavior in its determination whether or not, and when, to route around gateways. For example, if one of the gateways (e.g., GS(1)) is detected to have failed by the ACD, another gateway (e.g., GS(2)) may be configured to assume the ICW service operations of the failed gateway. The gateway redundancy is achieved by maintaining a copy of the subscriber information that are necessary for carrying out the ICW service operations for the failed gateway (e.g., GS(1)) in another gateway (e.g., GS(2)).

Figure 4:
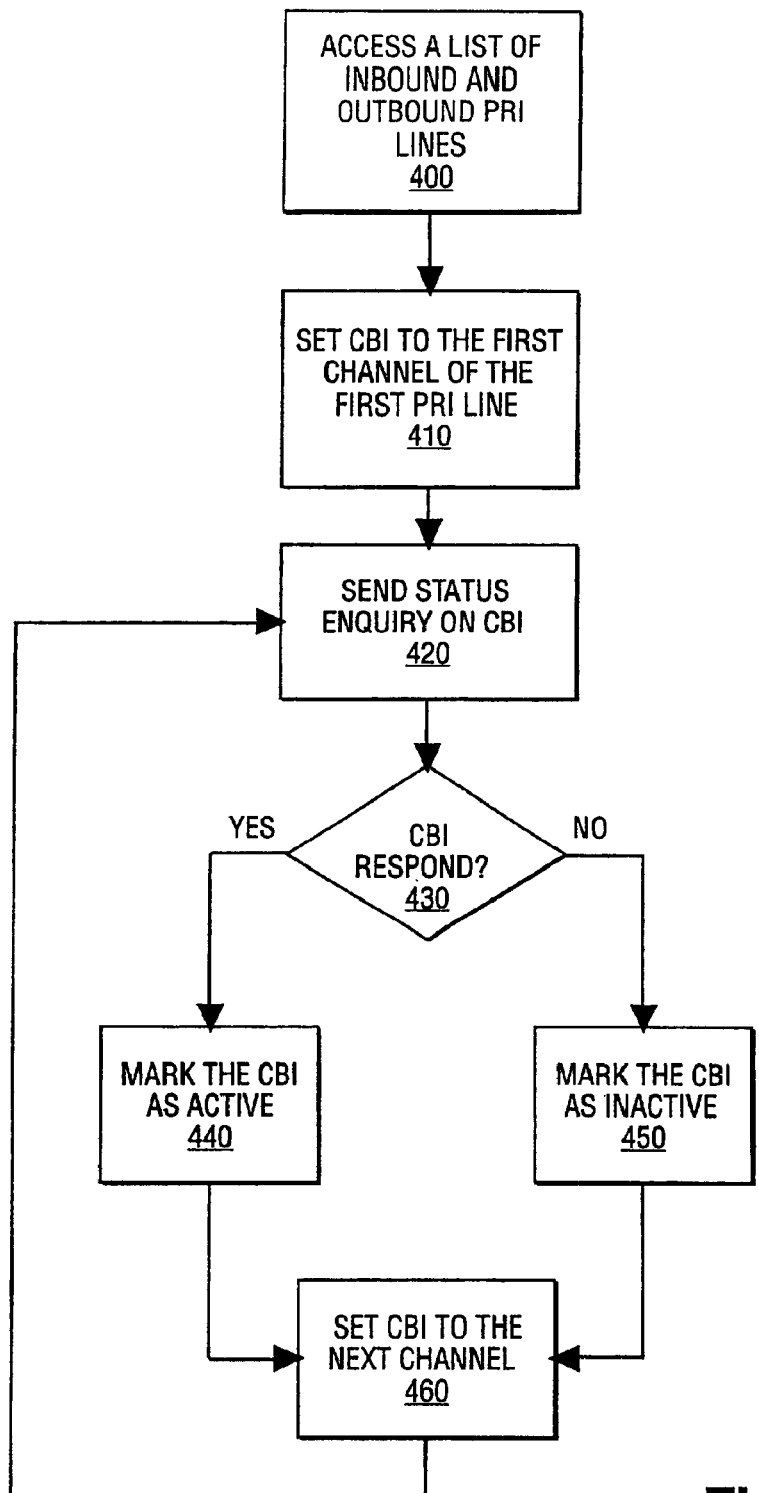
FIG. 4 is a flowchart of a monitoring process according to one embodiment of the invention.

FIG. 4 depicts operations of a monitoring logic according to one embodiment of the invention. In one embodiment, the monitoring logic resides in the ACD to keep up-to-date knowledge of which PRI line channels are active. In block 400, the monitoring logic accesses a list of inbound and outbound PRI lines from the configuration file. In block 410, the monitoring logic initially sets a variable (referred hereinafter as "channel being inspected" (CBI)) to the first channel of the first line. Then in block 420, the monitoring logic sends a signal (e.g., an ISDN "STATUS ENQUIRY" message) to the channel corresponding to the CBI and waits a defined time period to receive a response (e.g., STATUS response) back from the channel informing that the channel is active. If the response is received within the defined time (block 430, yes), the monitoring logic proceeds to block 440 and marks the channel corresponding to the CBI as active. On the other hand, if the channel is unresponsive to the signal initiated by the monitoring logic by the end of the defined time period (block 430, no), the monitoring logic proceeds to block 450 and marks the channel corresponding to the CBI as inactive. In block 460, the monitoring logic sets the CBI to the next channel on the PRI line and loop back to block 420 to examine the channel corresponding to the CBI. When all channels on a PRI line have been tested, the monitoring logic sets the CBI to the first channel of the next PRI line. When all channels on all PRI lines have been tested, the monitoring logic sets CBI back to the first channel of the first PRI line. This status information generated by the monitoring logic is used by the incoming call processing logic to automatically route the incoming calls to properly operating gateway in the event a failure has been detected in one of the gateways.

Figure 5:
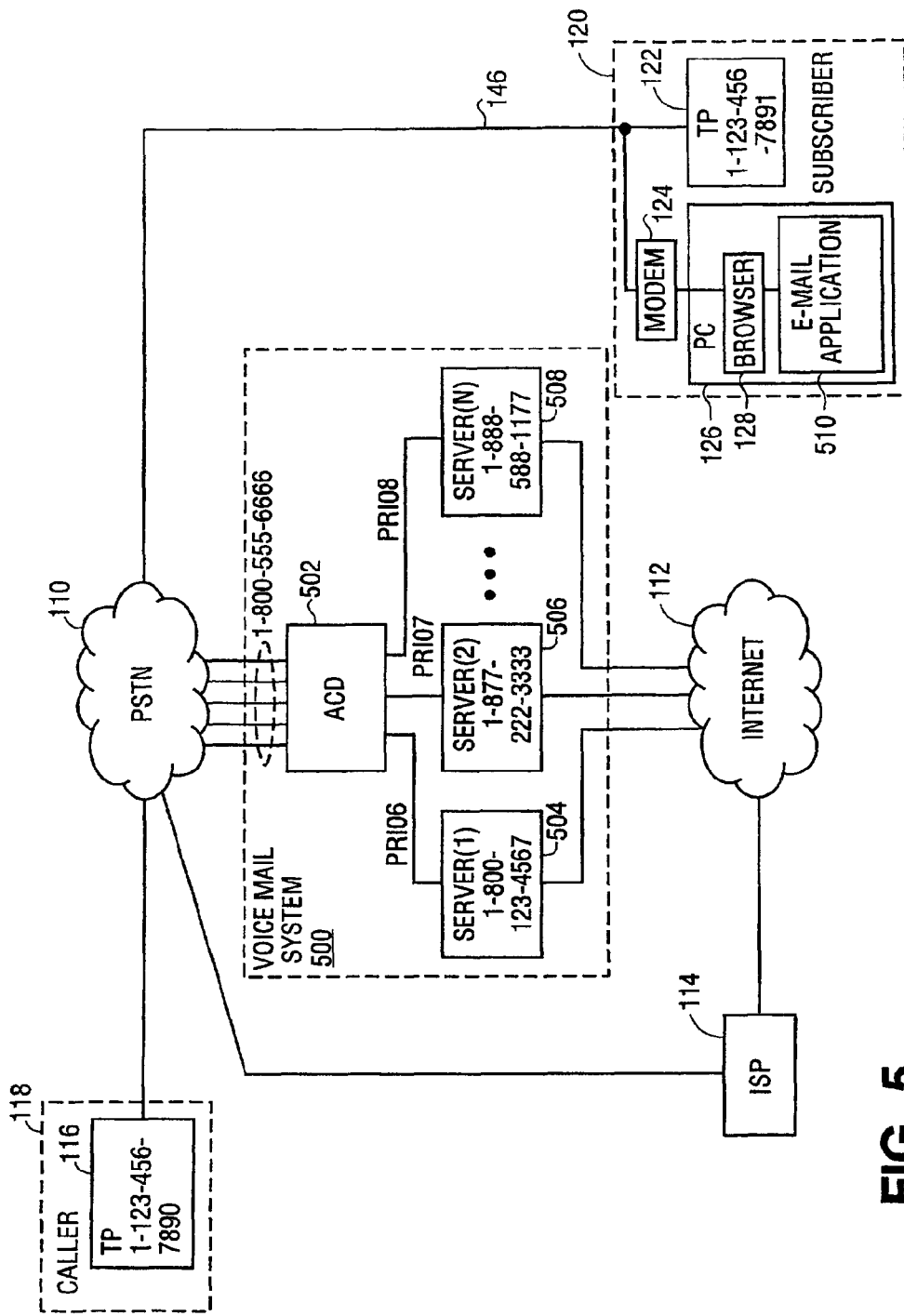
FIG. 5 is a block diagram of a system for providing voice mail service according to one embodiment of the present invention.

Although the system 100 shown in FIG. 1 is described in terms of providing Internet call waiting (ICW) service, it will be appreciated by one skilled in the relevant art that the present invention can be easily modified to provide other telephony services that depend on call forwarding, including but not limited to voice mail services and call forwarding facsimile transmittal services. A system 500 for providing voice mail service according to one embodiment of the invention is depicted in FIG. 5. In operation, when the subscriber's telephone line 146 busy, telephone calls to the subscriber will automatically get forwarded to the voice mail system 500 via a call forwarding feature provided by a telephone company. Once the incoming call originally designated for the subscriber 120 gets forwarded to the voice mail system 500, the ACD 502 will route the call to one of the gateways 504–508 assigned to service the incoming call based on information contained in the RNE field of the setup message. Then, the gateway handling the incoming call will store the voice mail message from the caller and subsequently deliver the voice mail message to the recipient of the message via any conventional method, including via e-mail system or via the subscriber calling the voice mail service center. Advantageously, the voice mail system 500 of the present invention is able to provide a single centralized telephone number to service geographically dispersed voice mail service subscribers.

Figure 6:
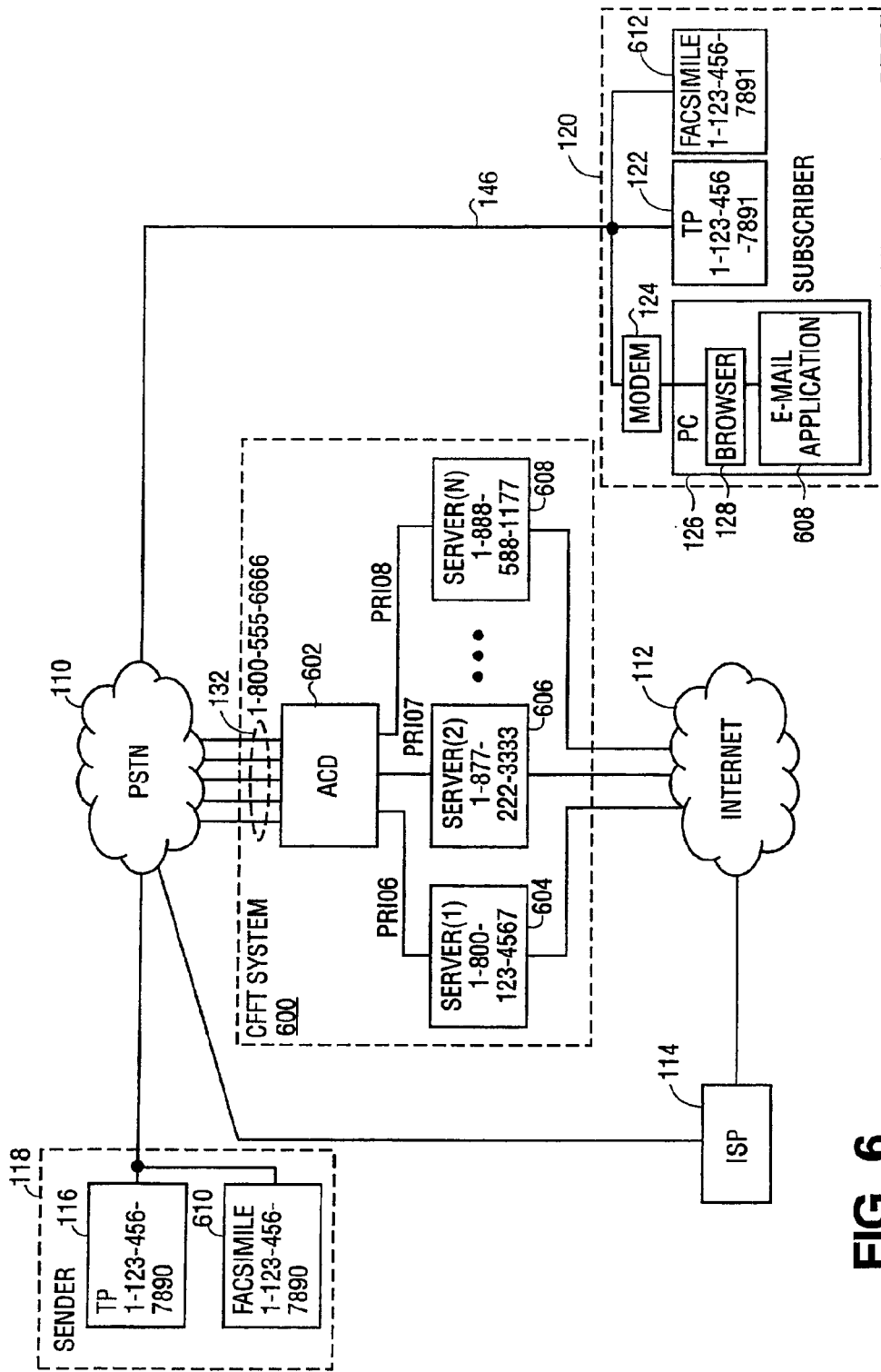
FIG. 6 is a block diagram of a system for providing call forwarding facsimile transmittal service according to one embodiment of the present invention.

FIG. 6 depicts a system 600 for providing call forwarding facsimile transmittal (CFFT) service according to one embodiment of the invention. If the subscriber's telephone line 146 is busy or the subscriber's facsimile is unable to receive the fax transmission, a fax message initiated by a sender 118 will automatically get forwarded to the CFFT system 600 via a call forwarding feature provided by a telephone company. Once the fax message gets forwarded to the CFFT system 600, the ACD 602 will automatically route the fax message to one of the gateways 604–608 assigned to service the fax message based on information contained in the RNE field of the setup message. After which, the gateway handling the fax message will store the fax message from the sender 118 and subsequently deliver the fax message to the recipient of the message via any conventional method, including via e-mail system or by initiating a telephone call to the subscriber's facsimile. The CFFT system 600 is able to provide a single centralized telephone number to service geographically dispersed facsimile transmittal service subscribers.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
   an automatic call distributor (ACD) coupled to receive incoming telephone calls from a public switched telephone network (PSTN); and
   a plurality of gateways coupled to said ACD, each one of said plurality of gateways assigned to service a group of subscribers, wherein said ACD selectively interconnects an incoming telephone call from the PSTN to an appropriate one of said plurality of gateways based on at least a portion of a setup message field identifying a telephone number forwarding the incoming telephone call.

2. The system of claim 1, wherein said plurality of gateways are coupled between said ACD and a packet switched network.

3. The system of claim 2, wherein said packet switched network comprises the Internet.

4. The system of claim 1, wherein said setup message field identifying the telephone number forwarding the incoming telephone call corresponds to a redirection number element (RNE) field of an incoming call setup message.

5. The system of claim 1, wherein said ACD modifies a setup message of an outbound call to said appropriate one of said plurality of gateways such that data contained in Automatic Number Identification (ANI) and Redirecting Number Element (RNE) fields of the setup message of the outbound call are same as ANI and RNE fields of a setup message of said incoming telephone call received from said PSTN.

6. The system of claim 1, wherein said ACD includes a configuration file which contains a list of said gateways and at least one code associated with each of said gateways to indicate which group of su scribers are assigned to which gateway.

7. The system of claim 1, wherein said ACD includes a configuration file which contains a list of said gateways and at least one telephone area code associated with each of said gateways to indicate that calls forwarded from a certain telephone area code is assigned to be serviced by one of said gateways associated with the area code.

8. The system of claim 1, wherein said ACD includes a monitoring logic to identify gateways that are operating properly and gateways that have failed.

9. The system of claim 8, wherein said ACD automatically routes the incoming calls to another gateway in the event a failure is detected in one of said gateways assigned to service the incoming call.

10. The system of claim 9, wherein at least one of said gateways has a copy of subscriber information associated with subscribers assigned to another gateway.

11. The system of claim 3, wherein each of said gateways executes an Internet call waiting server application which examines a setup message of the incoming call forwarded y the ACD to identify an IP address associated with a telephone line originally forwarding the incoming call and forward a notification of the incoming call over the Internet to the IP address identified.

12. The system of claim 1, wherein each of said gateways executes an application to provide voice mail services.

13. The system of claim 1, wherein each of said gateways executes an application to provide call forwarding facsimile transmittal services.

14. The system of claim 1, further comprising at least one Primary Rate Interface (PRI) line to interconnect the ACD to the PSTN and PRI lines to interconnect the ACD to the gateways.

15. A method comprising:
   receiving an incoming call from a public switched telephone network;
   examining a portion of a setup message of said incoming call that identifies a telephone number forwarding said incoming call;
   identifying one of a plurality of gateways assigned to service said incoming call based on said portion of said setup message examined; and
   routing said incoming call to said one of said gateways assigned to service said incoming call.

16. The method of claim 15, wherein said portion of said setup message examined corresponds to a redirection number element (RNE) field of said setup message.

17. The method of claim 16, wherein determining which gateway is assigned to service said incoming call comprises searching through a configuration file to determine which outbound line corresponds with a portion of data contained in said RNE field of said incoming call setup message.

18. The method of claim 15, further comprising modifying a setup message of an outbound call to said one of said gateways such that data contained in Automatic Number Identification (ANI) and Redirecting Number Element (RNE) fields of the setup message of the outbound call are same as ANI and RNE fields of said setup message of said incoming telephone call received from said PSTN, prior to routing said incoming call to said one of said gateways.

19. The method of claim 15, further comprising monitoring status of each of said gateways to identify which gateways are operating properly and which gateways have failed.

20. The method of claim 19, further comprising routing said incoming calls to another gateway in the event a failure is detected in one of said gateways assigned to service the incoming call.

21. The method of claim 15, wherein each of said gateways executes an Internet call waiting server application which examines a setup message of the incoming call to identify an IP address associated with a telephone line originally forwarding the incoming call and forward a notification of the incoming call over the Internet to the IP address identified.

22. The method of claim 15, wherein each of said gateways executes an application to provide voice mail services.

23. The method of claim 15, wherein each of said gateways executes an application to provide call forwarding facsimile transmittal services.

24. A machine-readable medium that provides instructions, which when executed by a processor, cause said processor to perform operations comprising:

examining a portion of a setup message of an incoming call that identifies a telephone number forwarding the incoming call, said incoming call forwarded from a telephone line of a subscriber via a public switched telephone network (PSTN); and selectively interconnecting said incoming telephone call to one of a plurality of gateways based on said portion of the setup message.

25. The machine-readable medium of claim 24, wherein said incoming calls are selectively interconnected to one of said gateways based on a redirecting number element (RNE) field of the setup message of the incoming call.

26. The machine-readable medium of claim 25, wherein said operations further comprises searching through a configuration file to determine which outbound line corresponds with a portion of data contained in said RNE field of said incoming call setup message.

27. The machine-readable medium of claim 24, wherein said operation further comprises modifying a setup message of an outbound call to said one of said plurality of gateways such that data contained in Automatic Number Identification (ANI) and Redirecting Number Element (RNE) fields of the setup message of the outbound call are same as ANI and RNE fields of said setup message of said incoming call received from said PSTN, prior to selectively interconnecting said incoming telephone call to one of a plurality of gateways.

28. The machine-readable medium of claim 24, wherein said operations further comprises monitoring status of each of said gateways to identify which gateways are operating properly and which gateways have failed.

29. The machine-readable medium of claim 28, wherein said operations further comprises routing said incoming calls to another gateway in the event a failure is detected in one of said gateways assigned to service the incoming call.

* * * * *

UNITED STATES PATENT AND TRADEMARK OFFICE
CERTIFICATE OF CORRECTION

PATENT NO. : 6,895,002 B2
DATED : May 17, 2005
INVENTOR(S) : Shah et al.

It is certified that error appears in the above-identified patent and that said Letters Patent is hereby corrected as shown below:

Column 9,
Line 59, delete "su scribers" and insert -- subscribers --.

Column 10,
Line 10, delete "y" and insert -- by --.

Signed and Sealed this

Twelfth Day of July, 2005

JON W. DUDAS
*Director of the United States Patent and Trademark Office*